US011130096B2

(12) United States Patent
Shacklady-McAtee et al.

(10) Patent No.: US 11,130,096 B2
(45) Date of Patent: Sep. 28, 2021

(54) MULTI-LAYER CATALYST COMPOSITION FOR INTERNAL COMBUSTION ENGINES

(71) Applicant: BASF Corporation, Florham Park, NJ (US)

(72) Inventors: Danielle Maria Shacklady-McAtee, Chanhassen, MN (US); Ye Liu, Holmdel, NJ (US); Pascaline Harrison Tran, Holmdel, NJ (US)

(73) Assignee: BASF CORPORATION, Florham Park, NJ (US)

( * ) Notice: Subject to any disclaimer, the term of this patent is extended or adjusted under 35 U.S.C. 154(b) by 246 days.

(21) Appl. No.: 16/074,215

(22) PCT Filed: Feb. 1, 2017

(86) PCT No.: PCT/IB2017/050549
§ 371 (c)(1),
(2) Date: Jul. 31, 2018

(87) PCT Pub. No.: WO2017/134585
PCT Pub. Date: Aug. 10, 2017

(65) Prior Publication Data
US 2018/0333677 A1 Nov. 22, 2018

Related U.S. Application Data

(60) Provisional application No. 62/290,670, filed on Feb. 3, 2016.

(51) Int. Cl.
*B01J 21/04* (2006.01)
*B01J 21/06* (2006.01)
(Continued)

(52) U.S. Cl.
CPC .......... *B01D 53/945* (2013.01); *B01J 21/066* (2013.01); *B01J 23/002* (2013.01);
(Continued)

(58) Field of Classification Search
CPC ... B01J 23/10; B01J 23/40; B01J 23/42; B01J 23/44; B01J 23/46; B01J 23/464;
(Continued)

(56) References Cited

U.S. PATENT DOCUMENTS

| 5,948,723 | A | * | 9/1999 | Sung | B01J 35/0006 502/303 |
| 7,374,729 | B2 | * | 5/2008 | Chen | B01J 23/63 422/177 |

(Continued)

FOREIGN PATENT DOCUMENTS

| CN | 101939084 A | 1/2011 |
| CN | 105874178 A | 8/2016 |

(Continued)

OTHER PUBLICATIONS

European Search Report for EP Patent Application No. 17747084.6, dated Jun. 13, 2019, 3 pages.

*Primary Examiner* — Cam N. Nguyen
(74) *Attorney, Agent, or Firm* — Baltazar Gomez (57) ABSTRACT

The invention provides a catalyst article including a substrate underlying a multi-layer catalyst composition and a multi-layer catalyst composition comprising a first layer and a second layer, the first layer positioned between the substrate and the second layer, wherein the first layer comprises a first porous refractory oxide material impregnated with at least one base metal component and the second layer comprises a second porous refractory oxide material impregnated with at least one platinum group metal. Either the second porous refractory oxide material is a porous refractory oxide material other than alumina or the catalyst composition further comprises an intermediate layer between the first layer and the second layer, the intermediate layer comprising a refractory oxide material other than alumina. Methods of making and using the catalyst article (Continued)

are also provided, as well as emission treatment systems comprising the catalyst article.

14 Claims, 6 Drawing Sheets

(51) Int. Cl.

| | |
|---|---|
| *B01J 21/08* | (2006.01) |
| *B01J 21/12* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/63* | (2006.01) |
| *B01J 23/89* | (2006.01) |
| *B01J 35/00* | (2006.01) |
| *B01J 35/04* | (2006.01) |
| *B01J 37/00* | (2006.01) |
| *B01J 37/02* | (2006.01) |
| *B01J 37/08* | (2006.01) |
| *B01D 53/94* | (2006.01) |
| *B01J 23/00* | (2006.01) |
| *B01J 23/889* | (2006.01) |

(52) U.S. Cl.
CPC ....... *B01J 23/8986* (2013.01); *B01J 35/0006* (2013.01); *B01J 35/04* (2013.01); *B01J 37/0009* (2013.01); *B01J 37/0201* (2013.01); *B01J 37/0225* (2013.01); *B01J 37/0244* (2013.01); *B01J 37/088* (2013.01); *B01D 2255/1025* (2013.01); *B01D 2255/2065* (2013.01); *B01D 2255/2073* (2013.01); *B01D 2255/2092* (2013.01); *B01D 2255/20715* (2013.01); *B01D 2255/20761* (2013.01); *B01D 2255/9022* (2013.01); *B01J 23/8892* (2013.01); *B01J 37/0036* (2013.01); *B01J 2523/00* (2013.01); *B01J 2523/17* (2013.01); *B01J 2523/31* (2013.01); *B01J 2523/3712* (2013.01); *B01J 2523/48* (2013.01); *B01J 2523/72* (2013.01); *B01J 2523/822* (2013.01); *Y02T 10/12* (2013.01)

(58) Field of Classification Search
CPC ........ B01J 23/63; B01J 23/6562; B01J 23/89; B01J 23/8906; B01J 23/892; B01J 23/8926; B01J 23/8933; B01J 23/894; B01J 23/8986; B01J 37/009; B01J 37/0201; B01J 37/0225; B01J 37/0244; B01J 37/088; B01J 21/04; B01J 21/06; B01J 21/063; B01J 21/066; B01J 21/08; B01J 21/12; B01J 35/04; B01J 35/0006; B01D 53/945
See application file for complete search history.

(56) References Cited

U.S. PATENT DOCUMENTS

| | | | | |
|---|---|---|---|---|
| 7,501,098 | B2* | 3/2009 | Chen | B01J 23/40 422/177 |
| 7,749,472 | B2* | 7/2010 | Chen | B01J 33/00 423/213.2 |
| 7,947,238 | B2* | 5/2011 | Deeba | B01D 53/944 423/213.2 |
| 7,981,390 | B2* | 7/2011 | Galligan | B01J 23/002 423/213.5 |
| 8,668,877 | B2* | 3/2014 | Wei | B01D 53/944 422/177 |
| 8,828,343 | B2* | 9/2014 | Liu | B01D 53/945 423/213.5 |
| 8,833,064 | B2* | 9/2014 | Galligan | B01J 23/63 60/299 |
| 8,950,174 | B2* | 2/2015 | Hilgendorff | B01J 37/0203 60/299 |
| 9,114,385 | B2 | 8/2015 | Brisley et al. | |
| 9,242,242 | B2* | 1/2016 | Hilgendorff | B01D 53/9477 |
| 9,283,547 | B2* | 3/2016 | Alive | B01J 37/348 |
| 9,440,192 | B2* | 9/2016 | Hoke | F01N 3/10 |
| 9,579,638 | B2* | 2/2017 | Fedeyko | B01J 37/0244 |
| 9,649,596 | B2* | 5/2017 | Chang | B01J 37/0246 |
| 9,707,545 | B2* | 7/2017 | Felix | B01J 23/44 |
| 9,757,718 | B2* | 9/2017 | Fedeyko | B01J 35/0006 |
| 9,789,441 | B2* | 10/2017 | Larsson | B01J 29/7615 |
| 9,878,287 | B2* | 1/2018 | Lu | B01J 29/44 |
| 10,105,692 | B2* | 10/2018 | Andersen | B01J 23/30 |
| 10,137,414 | B2* | 11/2018 | Hoke | B01D 53/9454 |
| 10,252,217 | B2* | 4/2019 | Zhang | B01J 23/42 |
| 10,332,372 | B2* | 6/2019 | Skjellerup | G08B 13/246 |
| 10,335,776 | B2* | 7/2019 | Sung | B01J 35/0006 |
| 10,773,209 | B2* | 9/2020 | Liu | B01D 53/945 |
| 2009/0324469 | A1 | 12/2009 | Golden et al. | |
| 2011/0099987 | A1 | 5/2011 | Satou et al. | |
| 2011/0107752 | A1 | 5/2011 | Galligan et al. | |
| 2011/0250114 | A1 | 10/2011 | Augustine et al. | |
| 2012/0180464 | A1 | 7/2012 | Wei et al. | |
| 2014/0205523 | A1 | 7/2014 | Arnold et al. | |
| 2015/0031530 | A1 | 1/2015 | Hao et al. | |

FOREIGN PATENT DOCUMENTS

| | | |
|---|---|---|
| JP | 2014-501613 A | 1/2014 |
| WO | 2012/099868 A2 | 7/2012 |
| WO | 2013/163523 A1 | 10/2013 |
| WO | 2015/101766 A1 | 7/2015 |
| WO | WO 2015/101766 | 7/2015 |

* cited by examiner

MULTI-LAYER CATALYST COMPOSITION FOR INTERNAL COMBUSTION ENGINES

CROSS-REFERENCE TO RELATED APPLICATIONS

The present application is a U.S. National Stage of International Patent Application PCT/IB2017/050549, filed Feb. 1, 2017 and claims priority to U.S. Provisional Patent Application No. 62/290,670, filed Feb. 3, 2016. The disclosures of each of the applications noted above are incorporated herein by reference in their entireties.

FIELD OF THE INVENTION

The present invention relates to catalyst articles coated with a multi-layer catalyst composition, emission treatment systems comprising such a catalyst article, and methods of use and manufacture thereof.

BACKGROUND OF THE INVENTION

The exhaust gases of internal combustion engines contain pollutants such as hydrocarbons, carbon monoxide and nitrogen oxides ($NO_x$). Emission standards for unburned hydrocarbons, carbon monoxide, and nitrogen oxide contaminants have been set by various governments and must be met by older as well as new vehicles. In order to meet such standards, catalytic materials, such as a three way conversion catalyst (TWC), may be located in the exhaust gas line of internal combustion engines. The use of exhaust gas catalysts have contributed to a significant improvement in air quality. The TWC is the most commonly used catalyst and such catalysts provide the three functions of oxidation of CO, oxidation of unburned hydrocarbons (HC's), and reduction of NOx to $N_2$. TWC catalysts typically utilize one or more platinum group metals (PGM) to simultaneously oxidize CO and HC and reduce NOx compounds.

The PGM component of the TWC catalyst is typically dispersed on a high surface area, refractory metal oxide support, such as a high surface area alumina. The catalyst composition is typically carried on a suitable carrier or substrate, such as a monolithic substrate comprising a refractory ceramic or metal honeycomb structure. The TWC catalyst substrate may also be a wire mesh, typically a metal wire mesh, which is particularly useful in small engines.

In certain applications, it is useful for the TWC catalyst to combine the PGM component with additional metal-containing catalytic components that are also useful to oxidize carbon monoxide or unburned hydrocarbons. However, combining a PGM component with other metal catalyst materials can be challenging as alloying or other interaction between the PGM component and the additional metal can lead to deactivation of catalytic activity. Accordingly, there remains a need in the art for additional TWC catalyst compositions that inhibit or minimize interaction between incompatible metal catalyst components.

SUMMARY OF THE INVENTION

The invention provides a catalyst composition suitable for oxidation of gaseous HC and CO emissions and conversion of NOx to $N_2$. The catalyst composition utilizes a refractory oxide material other than alumina as a barrier to prevent migration of base metal materials from one layer of the catalyst composition to a layer containing a PGM component.

In one aspect, the invention provides a catalyst article comprising a multi-layer catalyst composition adapted for oxidation of gaseous HC and CO emissions and conversion of NOx to $N_2$, the catalyst article comprising a substrate underlying a multi-layer catalyst composition; and a multi-layer catalyst composition comprising a first layer and a second layer, the first layer positioned between the substrate and the second layer, wherein the first layer comprises a first porous refractory oxide material impregnated with at least one base metal component and the second layer comprises a second porous refractory oxide material impregnated with at least one platinum group metal, wherein either the second porous refractory oxide material is a porous refractory oxide material other than alumina or the multi-layer catalyst composition further comprises an intermediate layer between the first layer and the second layer, the intermediate layer comprising a refractory oxide material other than alumina. An exemplary substrate has a plurality of channels adapted for gas flow, each channel having a wall surface upon which the multi-layer catalyst composition is coated.

In one particular embodiment, the invention provides a catalyst article comprising a multi-layer catalyst composition adapted for oxidation of gaseous HC and CO emissions and conversion of NOx to $N_2$, the catalyst article comprising: a substrate in adherence to a multi-layer catalyst composition; the multi-layer catalyst composition comprising a first layer, a second layer and optionally an intermediate layer between the first and second layers; the first layer positioned between the substrate and the second layer and comprising a first porous refractory oxide material impregnated with at least one base metal component; the second layer comprising a second porous refractory oxide material impregnated with at least one platinum group metal; and the intermediate layer comprising a refractory oxide material, wherein the second layer is substantially free of alumina and/or the intermediate layer is present and is substantially free of alumina.

In certain embodiments, the first porous refractory oxide material is selected from the group consisting of alumina, silica, zirconia, titania, ceria, and combinations thereof. The base metal component can be, for example, selected from oxides of copper, manganese, iron, nickel, cerium, praseodymium, and combinations thereof. When present, the intermediate layer comprises a refractory oxide material selected from the group consisting of silica, zirconia, titania, ceria, and combinations thereof. The second porous refractory oxide material is typically selected from the group consisting of silica, zirconia, titania, ceria, and combinations thereof. In certain embodiments, both the intermediate layer, when present, and the second layer can be characterized as substantially free of alumina. One or both of the first and second layers can further include an oxygen storage component, such as ceria.

In one particular embodiment, the first layer comprises alumina impregnated with at least one base metal component and optionally ceria, and the second layer comprises zirconia impregnated with at least one platinum group metal and optionally ceria, and wherein the second layer is substantially free of alumina. In one embodiment, at least one base metal component comprises at least one of copper oxide and manganese oxide and at least one platinum group metal comprises rhodium.

In certain embodiments, the catalyst article, upon aging at 950° C. for eight hours, is characterized by less than about 15% by weight of the total base metal content being present in the second layer.

In another aspect, the invention provides a method of treating an exhaust stream, comprising passing the exhaust stream through a catalyst article according to any of the embodiments set forth herein, such that carbon monoxide and hydrocarbon gases within the exhaust stream are oxidized and NOx is converted to $N_2$ within the catalyst article.

In yet another aspect, the invention provides an emission treatment system for treatment of an exhaust gas stream, the emission treatment system comprising an internal combustion engine producing an exhaust gas stream; and a catalyst article according to any of the embodiments set forth herein positioned in fluid communication with the exhaust gas stream and adapted for oxidation of carbon monoxide and hydrocarbon gases and conversion of NOx to $N_2$ within the exhaust stream to form a treated exhaust gas stream.

In a still further aspect, the invention provides a method for preparing a catalyst article comprising a multi-layer catalyst composition adapted for oxidation of gaseous HC and CO emissions and conversion of NOx to $NO_2$, the method comprising:

forming a first washcoat slurry comprising a first porous refractory oxide material impregnated with at least one base metal component;

exposing a catalyst substrate having a plurality of channels adapted for gas flow to the first washcoat slurry to coat the channels with the first washcoat slurry;

calcining the catalyst substrate to form a first layer on the catalyst substrate;

optionally, forming an intermediate washcoat slurry comprising a porous refractory oxide material other than alumina;

optionally, exposing the catalyst substrate to the intermediate washcoat slurry to coat the channels with the intermediate washcoat slurry;

optionally, calcining the catalyst substrate to form an intermediate layer on the catalyst substrate;

forming a second washcoat slurry comprising a second porous refractory oxide material impregnated with at least one platinum group metal;

exposing the catalyst substrate to the second washcoat slurry to coat the channels with the second washcoat slurry; and calcining the catalyst substrate to form a second layer on the catalyst substrate, wherein if the optional intermediate layer is not present on the catalyst article, the second porous refractory oxide material is a refractory oxide material other than alumina. The materials of each layer of the multi-layer catalyst composition can include any of the embodiments set forth herein.

The invention includes, without limitation, the following embodiments.

Embodiment 1

A catalyst article comprising a multi-layer catalyst composition adapted for oxidation of gaseous HC and CO emissions and conversion of NOx to $N_2$, the catalyst article comprising: a substrate in adherence to a multi-layer catalyst composition; the multi-layer catalyst composition comprising a first layer, a second layer and optionally an intermediate layer between the first and second layers; the first layer positioned between the substrate and the second layer and comprising a first porous refractory oxide material impregnated with at least one base metal component; the second layer comprising a second porous refractory oxide material impregnated with at least one platinum group metal; and the intermediate layer comprising a refractory oxide material, wherein the second layer is substantially free of alumina and/or the intermediate layer is present and is substantially free of alumina.

Embodiment 2

The catalyst article of any preceding or subsequent embodiment, wherein the first porous refractory oxide material is selected from the group consisting of alumina, silica, zirconia, ceria, and combinations thereof; and/or wherein the second porous refractory oxide material is selected from the group consisting of silica, zirconia, titania, ceria, and combinations thereof.

Embodiment 3

The catalyst article of any preceding or subsequent embodiment, wherein the base metal oxide is selected from oxides of copper, manganese, iron, nickel, cerium, praseodymium, and combinations thereof.

Embodiment 4

The catalyst article of any preceding or subsequent embodiment, wherein multi-layer catalyst composition includes an intermediate layer comprising a refractory oxide material selected from the group consisting of silica, zirconia, titania, ceria, and combinations thereof.

Embodiment 5

The catalyst article of any preceding or subsequent embodiment, wherein one or both of the first and second layers further comprise an oxygen storage component.

Embodiment 6

The catalyst article of any preceding or subsequent embodiment, wherein the oxygen storage component is ceria.

Embodiment 7

The catalyst article of any preceding or subsequent embodiment, wherein the first layer comprises alumina impregnated with at least one base metal component and optionally ceria, and the second layer comprises zirconia impregnated with at least one platinum group metal and optionally ceria, and wherein the second layer is substantially free of alumina.

Embodiment 8

The catalyst article of any preceding or subsequent embodiment, wherein the at least one base metal component comprises at least one of copper oxide and manganese oxide and the at least one platinum group metal comprises rhodium.

Embodiment 9

The catalyst article of any preceding or subsequent embodiment, wherein the substrate has a plurality of channels adapted for gas flow, each channel having a wall surface upon which the multi-layer catalyst composition is coated.

Embodiment 10

The catalyst article of any preceding or subsequent embodiment, wherein the catalyst article, upon aging at 950° C. for eight hours, is characterized by less than about 15% by weight of the total base metal content being present in the second layer.

Embodiment 11

A method of treating an exhaust stream, comprising passing the exhaust stream through a catalyst article according to any preceding or subsequent embodiment such that carbon monoxide and hydrocarbon gases within the exhaust stream are oxidized and NOx is converted to $N_2$ within the catalyst article.

Embodiment 12

An emission treatment system for treatment of an exhaust gas stream, the emission treatment system comprising:
i) An internal combustion engine producing an exhaust gas stream; and
ii) a catalyst article according to any preceding or subsequent embodiment positioned in fluid communication with the exhaust gas stream and adapted for oxidation of carbon monoxide and hydrocarbon gases and conversion of NOx to $N_2$ within the exhaust stream to form a treated exhaust gas stream.

Embodiment 13

A method for preparing a catalyst article comprising a multi-layer catalyst composition adapted for oxidation of gaseous HC and CO emissions and conversion of NOx to $NO_2$, the method comprising:
forming a first washcoat slurry comprising a first porous refractory oxide material impregnated with at least one base metal component;
exposing a catalyst substrate having a plurality of channels adapted for gas flow to the first washcoat slurry to coat the channels with the first washcoat slurry;
calcining the catalyst substrate to form a first layer on the catalyst substrate;
optionally, forming an intermediate washcoat slurry comprising a porous refractory oxide material other than alumina;
optionally, exposing the catalyst substrate to the intermediate washcoat slurry to coat the channels with the intermediate washcoat slurry;
optionally, calcining the catalyst substrate to form an intermediate layer on the catalyst substrate;
forming a second washcoat slurry comprising a second porous refractory oxide material impregnated with at least one platinum group metal;
exposing the catalyst substrate to the second washcoat slurry to coat the channels with the second washcoat slurry; and
calcining the catalyst substrate to form a second layer on the catalyst substrate,
wherein, if the optional intermediate layer is not present on the catalyst article, the second porous refractory oxide material is a refractory oxide material other than alumina.

Embodiment 14

The method of any preceding or subsequent embodiment, wherein the first porous refractory oxide material is selected from the group consisting of alumina, silica, zirconia, ceria, and combinations thereof; and wherein the second porous refractory oxide material is selected from the group consisting of silica, zirconia, titania, ceria, and combinations thereof.

Embodiment 15

The method of any preceding or subsequent embodiment, wherein the base metal component is selected from oxides of copper, manganese, iron, nickel, cerium, praseodymium, and combinations thereof.

Embodiment 16

The method of any preceding or subsequent embodiment, wherein the intermediate layer comprises a refractory oxide material selected from the group consisting of silica, zirconia, titania, ceria, and combinations thereof.

Embodiment 17

The method of any preceding or subsequent embodiment, wherein the second layer is substantially free of alumina and wherein the intermediate layer, when present, is substantially free of alumina.

Embodiment 18

The method of any preceding or subsequent embodiment, wherein one or both of the first and second layers further comprise an oxygen storage component.

Embodiment 19

The method of any preceding or subsequent embodiment, wherein the oxygen storage component is ceria.

Embodiment 20

The method of any preceding or subsequent embodiment, wherein the first layer comprises alumina impregnated with at least one base metal component and optionally ceria, and the second layer comprises zirconia impregnated with at least one platinum group metal and optionally ceria, and wherein the second layer is substantially free of alumina.

Embodiment 21

The method of any preceding or subsequent embodiment, wherein the at least one base metal component comprises at least one of copper oxide and manganese oxide and the at least one platinum group metal comprises rhodium.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention is directed to an exhaust gas purifying catalyst and methods for its use. More particularly, the invention pertains to an exhaust gas purifying catalyst that provides a three-way conversion (TWC) function (i.e., achieves at least partial conversion of gaseous HC and CO emissions, and which further promotes the conversion of NOx to $NO_2$) and which may specifically be used to treat exhaust gas streams, especially those emanating from internal combustion engines, including gasoline engines. The catalysts of the invention generally comprise a platinum group metal (PGM) impregnated on a porous support material in one layer and a base metal impregnated on a porous support material in a separate layer.

It has been determined that, at high temperatures such as those experienced in catalyst service or during thermal aging of a catalyst material, base metal ions can form and migrate into adjacent coating layers. The present invention addresses the migration issue by utilizing a refractory metal oxide material other than alumina, either as the support for the PGM component or as a barrier layer between the base metal layer and the PGM layer. In this manner, the present invention provides multi-layer catalyst structures that inhibit or minimize migration of base metal into the PGM-containing layer, thereby reducing the possibility of alloying between the metals that can reduce catalytic activity.

As used herein, "impregnated" or "impregnation" refers to permeation of the catalytic material into the porous structure of the support material. The catalyst compositions can be prepared using incipient wetness impregnation techniques and coated onto a catalyst substrate using a washcoat technique as set forth more fully below.

Catalyst Composition

The catalyst composition of the invention is used in a multi-layer form. Reference below is made to a "bottom coat," a "top coat," and an "intermediate coat." These terms are only intended to convey placement of each coating layer relative to each other. In other words, the bottom coat must be closer to the substrate surface than the top coat, but there is no requirement that the bottom coat be adjacent to the substrate. Instead, for example, an undercoat could be used between the bottom coat and the substrate if desired. By extension, the top coat is placed further from the substrate surface than the intermediate coat or the bottom coat, but there is no requirement that the top coat form the top surface of the catalyst. A further layer can be placed over the top coat without departing from the invention. In addition, the optional intermediate coat must be between the bottom coat and the top coat, but does not have to be adjacent to either coat, meaning there could be further intervening layers in the multi-layer structure.

Bottom Coat

The catalyst composition of the invention comprises a bottom coat, otherwise referred to as a first layer herein, that includes one or more base metal components impregnated on a porous refractory oxide support, and typically further includes at least one oxygen storage component.

As used herein, "porous refractory oxide" refers to porous metal-containing oxide materials exhibiting chemical and physical stability at high temperatures, such as the temperatures associated with internal combustion engine exhaust. Exemplary refractory oxides include alumina, silica, zirconia, titania, ceria, and combinations thereof, including atomically-doped combinations and including high surface area or activated compounds such as activated alumina. Reference to a combination of refractory oxides includes both physical mixtures of oxides as well as composite oxide structures such as solid solutions, oxides coated or impregnated with additional oxides, and the like. Exemplary combinations of metal oxides include alumina-zirconia, ceria-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 $m^2/g$, often up to about 200 $m^2/g$ or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of 60 to 350 $m^2/g$, and typically 90 to 250 $m^2/g$.

The refractory oxide support component used as the carrier for the base metal component is typically present in an amount of about 25 to about 75 wt. % (e.g., about 40 to about 60 wt. %), based on the total washcoat layer weight after drying and calcining.

In some embodiments, porous refractory metal oxides include oxygen storage components (OSCs). "OSC" refers to an oxygen storage component, which is an entity that has multi-valent oxidation states and can actively react with oxidants such as oxygen ($O_2$) or nitric oxides ($NO_2$) under oxidative conditions, or reacts with reductants such as carbon monoxide (CO), hydrocarbons (HC), or hydrogen ($H_2$) under reduction conditions. Certain exemplary OSCs are rare earth metal oxides, which refers to one or more oxides of scandium, yttrium, and the lanthanum series defined in the Periodic Table of Elements. Examples of suitable oxygen storage components include ceria and praseodymia and combinations thereof. Delivery of an OSC to a washcoat layer can be achieved by the use of, for example, mixed oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium.

When present, the OSC component is typically used in an amount of about 15 to about 85 wt. % (e.g., about 20 to about 40 wt. %), based on the total washcoat layer weight after drying and calcining. In certain embodiments, the primary refractory oxide used as a support for the base metal component may exhibit OSC properties (e.g., ceria or zirconia) and, therefore, no further OSC component may be necessary. The OSC, when present, can also serve as a carrier for one or more base metal components, meaning the OSC can also be impregnated with a base metal.

The bottom coat composition also comprises one or more base metal oxide components impregnated on a porous refractory oxide support, such as any of the porous refractory oxide materials noted hereinabove including alumina. As used herein, "base metal component" refers to a transition metal or lanthanide, in either elemental metal or oxide form, that is catalytically active for oxidation of CO and/or conversion of HC, or promotes another catalytic component to be more active for oxidation of CO and/or conversion of HC, and particularly includes copper, manganese, cobalt, iron, chromium, nickel, praseodymium, cerium, and combinations thereof. The total concentration of base metal component can vary, but will typically be from about 1 wt. % to about 30 wt. % (e.g., about 10 to about 25 wt. %), based on the total washcoat layer weight after drying and calcining.

Combinations of base metal oxides are particularly advantageous for use in the invention. In certain embodiments, the base metal oxide combines copper oxide with one or more additional base metal oxides, such as manganese oxide, iron oxide, or cobalt oxide. In one embodiment, the base metal oxide component comprises copper oxide and manganese oxide, optionally including one or more additional base metal oxides such as iron oxide or cobalt oxide. Particularly advantageous combinations include a combination of copper oxide at a concentration of about 5 wt. % to about 25 wt. % with one or more additional base metal oxides at a total base metal concentration of about 5 wt. % to about 25 wt. %.

When used in combination with other oxides, copper oxide is typically present at a concentration that is equal to or greater than the other base metal oxide components, with exemplary weight ratios of copper to additional base metal being about 1:5 to about 5:1, more typically about 1.5:1 to about 3:1.

In one embodiment, the base metal oxide impregnated on a porous refractory oxide support (e.g., alumina) comprises about 5 wt. % to about 25 wt. % copper oxide (e.g., about 5 wt. % to about 20 wt. %), and about 1 wt. % to about 20 wt. % manganese oxide (e.g., about 2 wt. % to about 10 wt. %), based on the total washcoat layer weight after drying and calcining Optional Intermediate Coat As noted above, in one embodiment, the catalyst composition of the present invention includes an intermediate layer or coat between the bottom coat and the top coat. The intermediate layer comprises a refractory metal oxide material other than alumina. Exemplary refractory oxides include silica, zirconia, titania, ceria, and combinations thereof. In one particular embodiment, the intermediate coat comprises zirconia, optionally in combination with one or more additional refractory oxides such as ceria or titania. Where a combination with zirconia is used, the zirconia is typically the predominant component, such as combinations wherein the weight percentage of zirconia, based on the total weight of refractory metal oxides, is about 50% or greater, about 60% or greater, about 70% or greater, about 80% or greater, or about 90% or greater.

This layer is typically substantially free of alumina. By "substantially free of alumina" is meant that the intermediate layer comprises less than about 10% by weight, less than about 5% by weight, or less than about 1% by weight alumina. Depending on the desired application, the intermediate layer may or may not contain a catalytically active metal such as a PGM or base metal component. The purpose of the intermediate layer in this embodiment is to inhibit migration of base metal from the bottom coat into the top coat.

Top Coat

The catalyst composition of the invention includes a top coat, otherwise referred to as a second layer herein, that includes one or more platinum group metals impregnated on a porous refractory oxide support, and may further include at least one oxygen storage component.

As used herein, "platinum group metal" or "PGM" refers to platinum group metals or oxides thereof, including platinum (Pt), palladium (Pd), ruthenium (Ru), rhodium (Rh), osmium (Os), iridium (Ir), and mixtures thereof. In one embodiment, the PGM is rhodium. In other embodiments, the platinum group metal comprises a combination of platinum and palladium, such as in a weight ratio of about 1:10 to about 10:1, more typically in a platinum to palladium equal to or greater than about 1.5:1, equal to or greater than about 2:1, or equal to or greater than about 5:1. In certain embodiments, the PGM component is platinum only or palladium only. In other embodiments, the PGM component is a combination of rhodium and platinum or rhodium and palladium or platinum, palladium, and rhodium. The concentrations of PGM component (e.g., Pt, Pd, Rh or a combination thereof) can vary, but will typically be from about 0.05 wt. % to about 5 wt. % (e.g., about 0.05 wt. % to about 2 wt. %), based on the total weight of the washcoat layer after drying and calcining.

In embodiments including an intermediate layer as describe above, the top coat can include any of the refractory oxide support materials described herein, including alumina.

The refractory oxide support component in such an embodiment is used as the carrier for the PGM and is typically present in an amount of about 60 to about 99 wt. % (e.g., about 80 to about 99 wt. %), based on the total washcoat layer weight after drying and calcining.

In embodiments of the present invention without an intermediate layer as described above, the top coat utilizes a refractory oxide support for the PGM component other than alumina. Exemplary refractory oxides include silica, zirconia, titania, ceria, and combinations thereof. In this embodiment, the top coat layer is typically substantially free of alumina. By "substantially free of alumina" is meant that the top coat layer comprises less than about 10% by weight, less than about 5% by weight, or less than about 1% by weight alumina. In one particular embodiment, the top coat comprises zirconia, optionally in combination with one or more additional refractory oxides such as ceria or titania. Where a combination with zirconia is used, the zirconia is typically the predominant component, such as combinations wherein the weight percentage of zirconia, based on the total weight of refractory metal oxides, is about 50% or greater, about 60% or greater, about 70% or greater, about 80% or greater, or about 90% or greater.

When present, the OSC component is typically used in an amount of about 10 to about 80 wt. % (e.g., about 15 to about 30 wt. %), based on the total washcoat layer weight after drying and calcining. In certain embodiments, the primary refractory oxide used as a support for the PGM component may exhibit OSC properties (e.g., ceria or zirconia) and, therefore, no further OSC component may be necessary. The OSC, when present, can also serve as a carrier for one or more PGM components, meaning the OSC can also be impregnated with a PGM.

Substrate

According to one or more embodiments, the substrate for the catalyst composition may be constructed of any material typically used for preparing automotive catalysts and will typically comprise a metal or ceramic honeycomb structure. The substrate typically provides a plurality of wall surfaces upon which the catalyst composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium, and the like. The surface of the metal carriers may be oxidized at high temperatures, e.g., 1000° C. and higher, to form an oxide layer on the surface of the substrate, improving the corrosion resistance of the alloy and facilitating adhesion of the washcoat layer to the metal surface. Exemplary metallic substrates are set forth, for example, in U.S. Pat. No. 7,521,033 to Galligan et al.; U.S. Pat. No. 7,527,774 to Galligan; and U.S. Pat. No. 8,062,990 to Galligan et al., which are incorporated by reference herein in their entirety.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, a alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 100 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

Figure 1A:
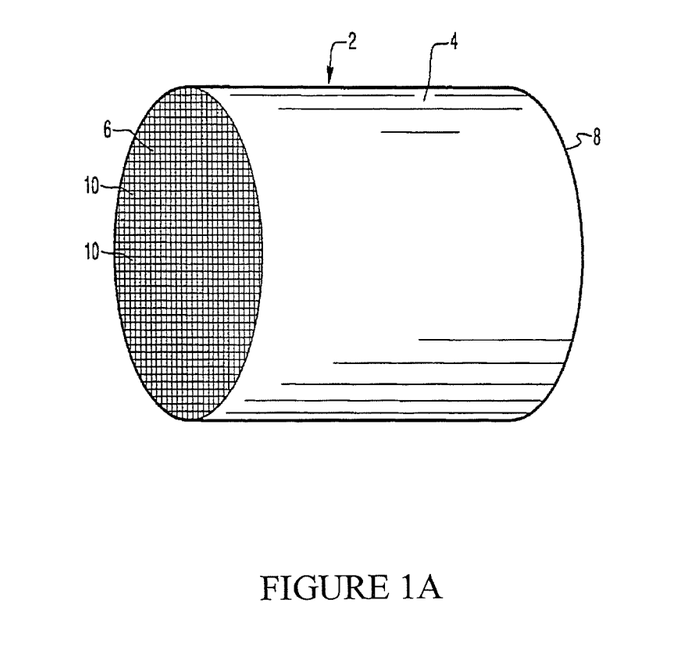
FIG. 1A is a perspective view of a honeycomb-type substrate carrier which may comprise a catalyst composition in accordance with the present invention.
Figure 1B:
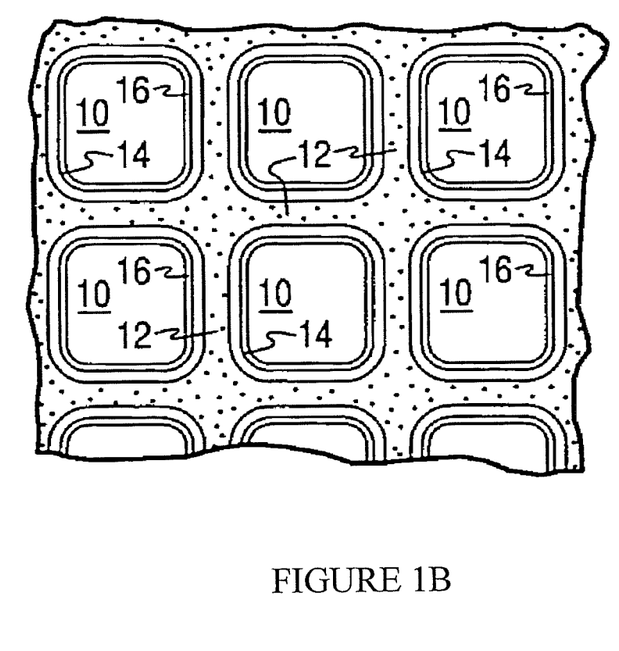
FIG. 1B is a partial cross-sectional view enlarged relative to FIG. 1A and taken along a plane parallel to the end faces of the substrate carrier of FIG. 1A, which shows an enlarged view of a plurality of the gas flow passages shown in FIG. 1A.

FIGS. 1A and 1B illustrate an exemplary substrate 2 in the form of a flow-through substrate coated with a washcoat composition as described herein, and also referred to herein as a catalyst article. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with two or more (e.g., 2, 3, or 4) washcoat layers and is not limited to the illustrated two-layer embodiment. The thickness of each layer, such as the bottom coat, intermediate coat, and top coat referenced herein, is typically in the range of about 0.25 g/in$^3$ to about 3.0 g/in$^3$.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the catalyst composition (including both impregnated base metal catalyst and impregnated PGM and support material) on the catalyst substrate, such as a monolithic flow-through substrate, is typically from about 0.5 to about 6 g/in$^3$, and more typically from about 1 to about 5 g/in$^3$. Total loading of the PGM component without support material (i.e., the Pt, Pd, Rh or combination thereof) is typically in the range of about 2 to about 200 g/ft$^3$. Total loading of the base metal component without support material (e.g., the copper oxide, manganese oxide, or combinations thereof) is typically in the range of about 0.1 to about 3.0 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Figure 2:
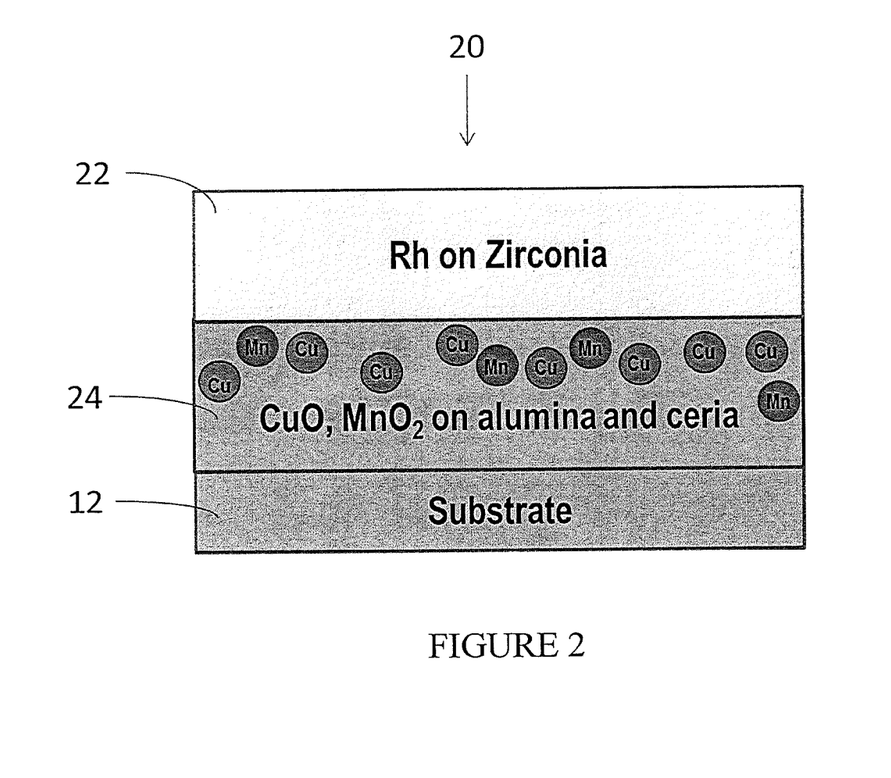
FIG. 2 is a cross-sectional representation of a substrate coated with a catalyst composition according to one embodiment of the invention.

FIG. 2 is a cross-sectional representation of one example embodiment of the multi-layer catalyst composition of the invention. As shown, the coated substrate 20 comprises a substrate wall 12 coated with a bottom coat 24 containing a base metal impregnated on a refractory metal oxide support and a top coat 22 comprising a PGM component impregnated on a refractory metal oxide support other than alumina. Although the illustrated embodiment includes Rh impregnated on zirconia in the top coat 22 and CuO and MnO$_2$ impregnated on alumina (with additional ceria) in the bottom coat 24, such coating compositions merely represent certain preferred embodiments and are not intended to be limiting. The presence of a refractory metal oxide support material other than alumina in the top coat 22 has been shown to impede migration of the base metal components (e.g., Cu and Mn) from the bottom coat 24 into the top coat.

Figure 3:
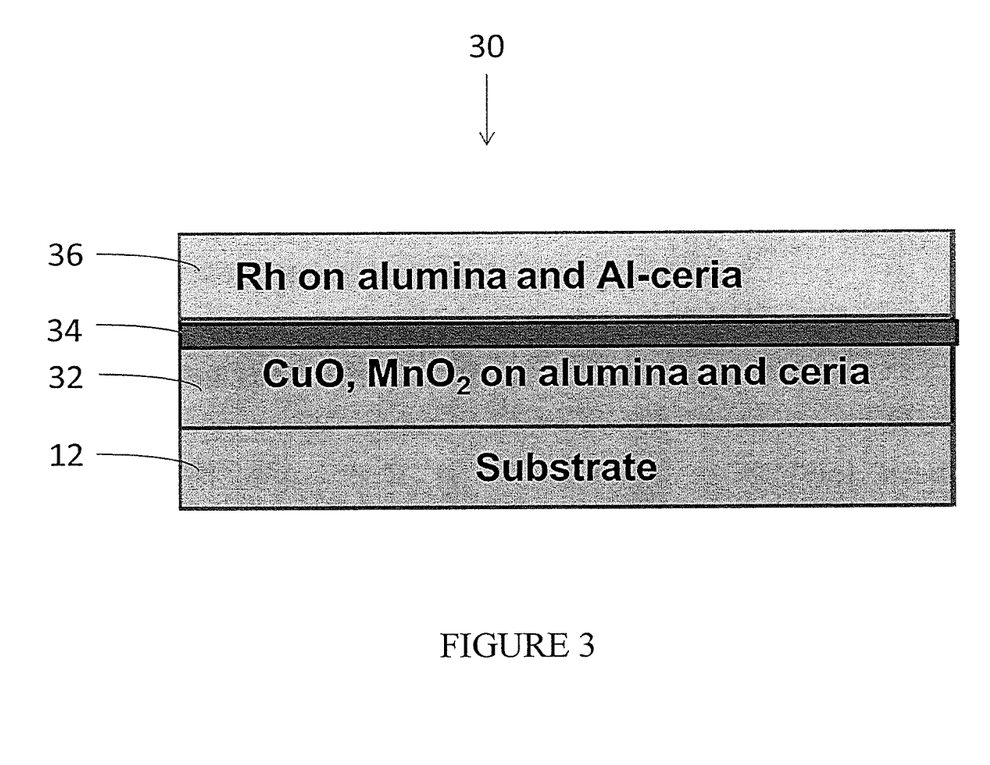
FIG. 3 is a cross-sectional representation of a substrate coated with a catalyst composition according to another embodiment of the invention.

FIG. 3 is a cross-sectional representation of a further example embodiment of the multi-layer catalyst composition of the invention. As shown, the coated substrate 30 comprises a substrate wall 12 coated with a bottom coat 32 containing a base metal impregnated on a refractory metal oxide support and a top coat 36 comprising a PGM component impregnated on a refractory metal oxide support that includes alumina. An intermediate layer 34 comprising a refractory metal oxide other than alumina (e.g., zirconia) is positioned between the top coat 36 and the bottom coat 32. The presence of a refractory metal oxide material other than alumina in the intermediate layer 34 is believed to impede the migration of base metal from the bottom coat 32 into the top coat 36. Although the illustrated embodiment includes Rh impregnated on alumina (with additional alumina-ceria) in the top coat 36 and CuO and MnO$_2$ impregnated on alumina (with additional ceria) in the bottom coat 32, such coating compositions merely represent certain preferred embodiments and are not intended to be limiting.

In certain embodiments, the catalyst article of the invention exhibits a surprising resistance to migration of base metal from the bottom layer into the PGM-containing top layer, including resistance to hydrothermal migration that can occur, for example, during thermal aging of the catalyst article. For example, in certain embodiments, upon aging at 950° C. for eight hours, a catalyst article of the invention is characterized by a relatively small amount of base metal, such as copper or manganese, in the top coat layer containing the PGM component. For example, in certain advantageous embodiments, less than about 15% by weight of the total base metal content in the catalyst article is present in the second layer after aging as noted above, more preferably less than about 12%, less than about 10%, or less than about 8%. In terms of specific base metals, in certain embodiments, the amount of copper in the top coat after the above aging protocol is less than about 15% by weight of the total copper content in the catalyst article, less than about 12%, or less than about 10%. In certain embodiments, the amount of manganese in the top coat after the above aging protocol is less than about 10% by weight of the total manganese content in the catalyst article, less than about 8%, less than about 5%, or even less than about 3%.

Method of Making Catalyst Composition

Preparation of the metal-impregnated refractory oxide materials used in the various layers of the catalyst composition typically entails impregnating the refractory oxide support material in particulate form with a metal solution, such as a PGM solution or a base metal solution. Multiple PGM components (e.g., platinum and palladium) can be impregnated at the same time or separately, and can be impregnated on the same support particles or separate support particles using an incipient wetness technique. Likewise, multiple base metal components (e.g., copper and manganese) can be impregnated at the same time or separately, and can be impregnated on the same support particles or separate support particles using an incipient wetness technique. The support particles are typically dry enough to absorb substantially all of the solution to form a moist solid.

Aqueous solutions of water soluble compounds or complexes of the metal compounds component are typically utilized, such as nitrate or acetate salts of the metals. Following treatment of the support particles with the metal solution(s), the particles are dried, such as by heat treating the particles at elevated temperature (e.g., 100-150° C.) for a period of time (e.g., 1-3 hours), and then calcining to convert the metal components to a more catalytically active form. An exemplary calcination process involves heat treatment in air at a temperature of about 400-550° C. for 1-3 hours. The above process can be repeated as needed to reach the desired level of metal impregnation. The resulting material can be stored as a dry powder or in slurry form.

Substrate Coating Process

The catalyst composition to be used in each layer of the catalyst composition is mixed with water to form a slurry for purposes of coating a catalyst substrate, such as a honeycomb-type substrate. In addition to the catalyst particles, the slurry may optionally contain alumina as a binder, hydrocarbon (HC) storage components (e.g., zeolite), water-soluble or water-dispersible stabilizers (e.g., barium acetate), promoters (e.g., lanthanum nitrate), associative thickeners, and/or surfactants (including anionic, cationic, non-ionic or amphoteric surfactants).

Optionally, as noted above, the slurry may contain one or more hydrocarbon (HC) storage component for the adsorption of hydrocarbons (HC). Any known hydrocarbon storage material can be used, e.g., a micro-porous material such as a zeolite or zeolite-like material. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Preferred zeolite adsorbent materials have a high silica to alumina ratio. The zeolites may have a silica/alumina molar ratio of from at least about 25:1, preferably at least about 50:1, with useful ranges of from about 25:1 to 1000:1, 50:1 to 500:1, as well as about 25:1 to 300:1. Preferred zeolites include ZSM, Y and beta zeolites. A particularly preferred adsorbent may comprises a beta zeolite of the type disclosed in U.S. Pat. No. 6,171,556, incorporated herein by reference in its entirety. When present, zeolite or other HC storage components are typically used in an amount of about 0.05 g/in$^3$ to about 1 g/in$^3$.

When present, the alumina binder is typically used in an amount of about 0.05 g/in$^3$ to about 1 g/in$^3$. The alumina binder can be, for example, boehmite, gamma-alumina, or delta/theta alumina.

Each slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 10 to about 30 microns. The D90 is defined as the particle size at which about 90% of the particles have a finer particle size.

The slurry for each layer is then sequentially coated on the catalyst substrate using a washcoat technique known in the art. As used herein, the term "washcoat" has its usual meaning in the art of a thin, adherent coating of a catalytic material applied to a substrate. In one embodiment, the catalyst substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

Emission Treatment System

Figure 6:
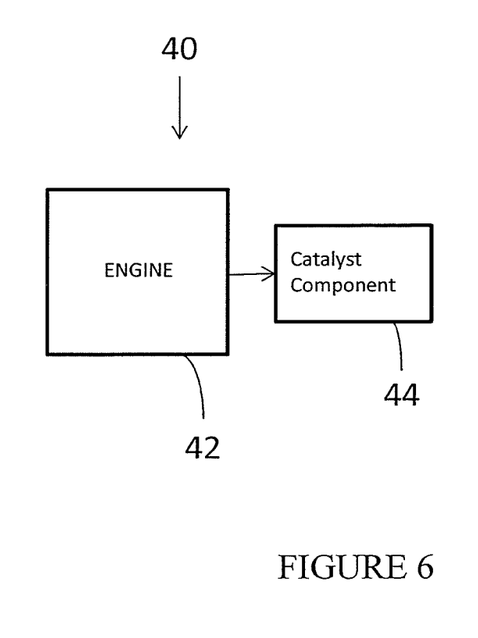
FIG. 6 shows a schematic depiction of an embodiment of an emission treatment system in which a catalyst composition of the present invention is utilized.

The present invention also provides an emission treatment system that incorporates the catalyst composition described herein. The catalyst composition of the present invention can be used as the sole catalyst component of an emission treatment system 40 as shown in FIG. 6, where a coated catalyst substrate of the invention is used as part of a catalyst component 44 downstream from an engine 42 and positioned to receive an exhaust gas from the engine.

The catalyst composition of the invention can also be used as part of an integrated emissions treatment system comprising one or more additional components for the treatment of exhaust gas emissions. For example, the emission treatment system may further comprise a catalyzed soot filter (CSF) component and/or a selective catalytic reduction (SCR) catalytic article. The treatment system can also include further components, such as ammonia oxidation materials, additional particulate filtration components, NO$_x$ storage and/or trapping components, and reductant injectors. The preceding list of components is merely illustrative and should not be taken as limiting the scope of the invention.

The CSF may comprise a substrate coated with a washcoat layer containing one or more catalysts for burning trapped soot and or oxidizing exhaust gas stream emissions. In general, the soot burning catalyst can be any known catalyst for combustion of soot. For example, the CSF can be catalyzed with one or more high surface area refractory oxides (e.g., an alumina or a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal catalysts (e.g., platinum, palladium, and/or rhodium).

The catalyst component 44 may be placed in a close-coupled position. Close-coupled catalysts are placed close to an engine to enable them to reach reaction temperatures as soon as possible. In specific embodiments, the close-coupled catalyst is placed within three feet, more specifically, within one foot of the engine, and even more specifically, less than six inches from the engine. Close-coupled catalysts are often attached directly to the exhaust gas manifold. Due to their close proximity to the engine, close-coupled catalysts are preferably stable at high temperatures.

Although the catalyst compositions of the invention are suitable for use in treating exhaust gases from any internal combustion engine, the compositions of the invention are particularly well-suited for use in smaller engines, such as two-stroke and four-stroke spark ignition engines having a displacement of less than about 1000 and preferably less than 500 cubic centimeters. This includes so-called utility engines often found, in particular, in gasoline-engine powered lawn mowers, motorized chain saws, portable generator units, snow blowers, grass/leaf blowers, string mowers, lawn edgers, garden tractors, motor scooters, motorcycles, mopeds, and like devices. The catalyst compositions of the invention are particularly well-suited for treating the exhaust of motorcycle engines.

EXPERIMENTAL

Aspects of the present invention are more fully illustrated by the following examples, which are set forth to illustrate certain aspects of the present invention and are not to be construed as limiting thereof.

The substrate cores referenced in the examples are honeycomb flow-through cores made of a Fe—Cr—Al alloy, and were subjected to a pre-oxidation protocol before use. In all examples, the bottom coat base metal loading was about 10% by weight copper oxide and about 5% by weight manganese oxide. The bottom coat catalyst loading in each example was about 1.5 g/in$^3$. The top coat of each example contained about 0.09% by weight rhodium and the top coat catalyst loading was about 1.3 g/in$^3$.

Comparative Example: Hybrid Catalyst–[Bottom Coat (Base Metal)]+[Top Coat (PGM) with Alumina Support]

The following process was used to prepare a comparative catalyst coated on a substrate, which contained alumina in the top coat.

Bottom Coat Slurry Preparation:

In a clear glass beaker with stir bar, Cu(NO$_3$)*3H$_2$O was added followed by Mn(NO$_3$)$_2$*4H$_2$O. Water was added and the mixture was stirred vigorously on a stir plate until all solids had dissolved. To a kitchen aid mixing bowl, alumina was added. Slowly over the course of approximately 30 minutes, the solution of copper and manganese in water was added dropwise with intervals of mixing to break up clumps. The slurry was then milled using single pass method until the desired particle size was obtained. The milled material was then transferred to a beaker and mixed using an overhead stirrer. Slowly ceria was added in small portions, followed by liquid alumina binder.

Coating Process for Bottom Coat:

A metallic core was hand dipped into the slurry and, using an air knife, excess slurry was removed. The process was repeated until the desired mass of wet slurry was successfully loaded on to the core. In a box oven, the wet cores went through a drying and calcination profile as follows: dry at 110° C. for 2 hours; ramp to 550° C. for 2 hours and hold at 550° C. for 2 hours; and cool to at 110° C. for 10 minutes. After the sequence, the core was measured while hot to determine total catalyst loading.

Top Coat Slurry Preparation:

Alumina was measured directly into a pre-weighed mixing bowl. To this a solution of rhodium nitrate in water was added dropwise with constant mixing to break up any clumps and ensure even distribution throughout powder.

In a separate bowl, the second support was impregnated. Ceria was measured directly into a pre-weighed mixing bowl. To this a solution of rhodium nitrate in water was added dropwise with constant mixing to break up any clumps and ensure even distribution throughout powder.

The impregnated alumina support was added portion wise with constant mixing to a solution comprising Ce-nitrate. The slurry was then milled method until the desired particle size was obtained. The milled material was then transferred to a beaker and mixed using an overhead stirred. To this milled material, the impregnated ceria support was added portion wise, followed by a solution of alumina binder with constant mixing.

Coating Process for Top Coat:

The metallic core coated with the bottom coat was hand dipped into the slurry and, using an air knife, excess slurry was removed. The process was repeated until the desired mass of wet slurry was successfully loaded on to the core. In a box oven, the wet cores went through a drying and calcination profile as follows: dry at 110° C. for 2 hours; ramp to 550° C. for 2 hours and hold at 550° C. for 2 hours; and cool to at 110° C. for 10 minutes. After the sequence, the core was measured while hot to determine total catalyst loading.

Inventive Example: Hybrid Catalyst–[Bottom Coat (Base Metal)]+[Top Coat (PGM) with Zirconia Support]

This catalyst composition was used to determine the effect of removing alumina from the top coat.

Bottom Coat Slurry Preparation:

In a clear glass beaker with stir bar, $Cu(NO_3)_2 \cdot 3H_2O$ was added followed by $Mn(NO_3)_2 \cdot 4H_2O$. Water was added and the mixture was stirred vigorously on a stir plate until all solids had dissolved. To a kitchen aid mixing bowl, alumina was added. Slowly over the course of approximately 30 minutes, the solution of copper and manganese in water was added dropwise with intervals of mixing to break up clumps. The slurry was then milled using single pass method until the desired particle size was obtained. The milled material was then transferred to a beaker and mixed using an overhead stirred. Slowly ceria was added in small portions, followed by liquid alumina binder.

Coating Process for Bottom Coat:

A metallic core was hand dipped into the slurry and, using an air knife, excess slurry was removed. The process was repeated until the desired mass of wet slurry was successfully loaded on to the core. In a box oven, the wet cores went through a drying and calcination profile as follows: dry at 110° C. for 2 hours; ramp to 550° C. for 2 hours and hold at 550° C. for 2 hours; and cool to at 110° C. for 10 minutes. After the sequence, the core was measured while hot to determine total catalyst loading.

Top Coat Slurry Preparation:

Zirconia was added into a pre-weighed beaker and to this a solution of rhodium nitrate in water was added dropwise with constant mixing. The slurry was then milled using single pass method until the desired particle size was obtained. The milled material was then transferred to a beaker and mixed using an overhead stirred. Zirconia acetate was added dropwise with constant mixing.

Figure 4:
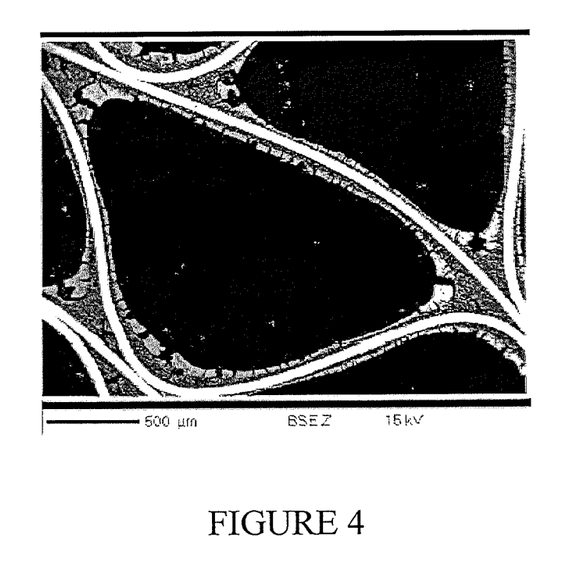
FIGS. 4 and 5 are SEM micrographs, at two different magnifications, of the coated substrate of the Inventive Example.
Figure 5:
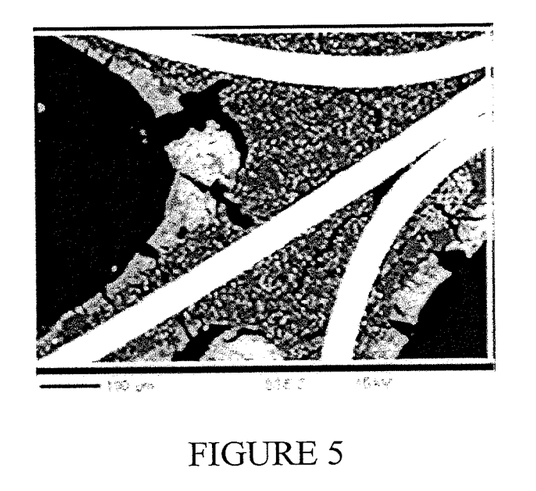

Coating Process for Top Coat:

The metallic core coated with the bottom coat was hand dipped into the slurry and, using an air knife, excess slurry was removed. The process was repeated until the desired mass of wet slurry was successfully loaded on to the core. In a box oven, the wet cores went through a drying and calcination profile as follows: dry at 110° C. for 2 hours; ramp to 550° C. for 2 hours and hold at 550° C. for 2 hours; and cool to at 110° C. for 10 minutes. After the sequence, the core was measured while hot to determine total catalyst loading. SEM micrographs at two different magnifications are taken of the coated core. FIGS. 4 and 5 illustrate the coated coat, clearly showing the two-layer structure.

Base Metal Migration Analysis:

An Electron Probe Micro-analyzer (EPMA) was used to analyze copper and manganese migration from the bottom coat into the top coat for aged catalysts made according to the above examples. The EPMA analyses were completed on a CAMECA SX-100 electron probe with column conditions set at 15 keV, 100 nA, and spectrometer conditions of Rh Lα, LPET 2d (angstroms)=8.742, Al Kα, TAP 2d (angstroms) =25.745, and Cu Kα, Mn Kβ, La Lα and Ce Lβ LLIF 2d (angstroms)=4.028. Pouchou and Pichoir (PAP) ZAF corrections were used for quantification. Three micron steps were used for the line profile analyses, while 375×281 resolution, two micron steps were used for the mapping.

All tested cores were aged at 950° C. for eight hours. For the Comparative Example, after aging, the weight percentage of the total copper in the catalyst that had migrated into the top coat was 34% and the weight percentage of the total manganese that had migrated into the top coat was 6%. In the Inventive Example, where zirconia was used as the support material for the rhodium instead of alumina, after aging, the percentage of the total copper in the catalyst that had migrated into the top coat was 10% by weight and there was no detectable manganese in the top coat. This clearly indicates that the use of zirconia instead of alumina as the refractory oxide support material in the top coat inhibited thermal migration of the base metals from the bottom coat.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A catalyst article comprising a multi-layer catalyst composition adapted for oxidation of gaseous HC and CO emissions and conversion of NOx to $N_2$, the catalyst article comprising:
    a substrate in adherence to a multi-layer catalyst composition;
    the mufti-layer catalyst composition comprising a first layer, a second layer and optionally an intermediate layer between the first and second layers;
    the first layer positioned between the substrate and the second layer and comprising a first porous refractory oxide material comprising alumina impregnated with at least one base metal component selected from the group consisting of oxides of copper, manganese, iron, nickel, cerium, praseodymium, and combinations thereof;
    the second layer comprising a second porous refractory oxide material comprising zirconia impregnated with at least one platinum group metal; and
    the intermediate layer comprising a refractory oxide material, wherein the second layer contains less than about 1% by weight alumina and/or the intermediate layer is present and contains less than about 1% by weight alumina.

2. The catalyst article of claim 1, wherein multi-layer catalyst composition includes an intermediate layer comprising a refractory oxide material selected from the group consisting of silica, zirconia, titania, ceria, and combinations thereof.

3. The catalyst article of claim 1, wherein one or both of the first and second layers further comprise an oxygen storage component.

4. The catalyst article of claim 3, wherein the oxygen storage component is cerin.

5. The catalyst article of claim 1, wherein the at least one base metal component comprises at least one of copper oxide and manganese oxide and the at least one platinum group metal comprises rhodium.

6. The catalyst article of claim 1, wherein the substrate has a plurality of channels adapted for gas flow, each channel having a wall surface upon which the multi-layer catalyst composition is coated.

7. The catalyst article of claim 1, wherein the catalyst article, upon aging at 950° C. for eight hours, comprises less than about 15% by weight of the total base metal content being present in the second layer.

8. A method of treating an exhaust stream, comprising passing the exhaust stream through the catalyst article according to claim 1 such that carbon monoxide and hydrocarbon gases within the exhaust stream are oxidized and NOx is converted to $N_2$ within the catalyst article.

9. An emission treatment system for treatment of an exhaust gas stream, the emission treatment system comprising:
    i) an internal combustion engine producing an exhaust gas stream; and
    ii) the catalyst article according to claim 1 positioned in fluid communication with the exhaust gas stream and adapted for oxidation of carbon monoxide and hydrocarbon gases and conversion of NOx to $N_2$ within the exhaust stream to form a treated exhaust gas stream.

10. A method for preparing the catalyst article according to claim 1 comprising a multi-layer catalyst composition adapted for oxidation of gaseous HC and CO emissions and conversion of NOx to $N_2$ and a substrate in adherence to a multi-layer catalyst composition,
    the method comprising:
    forming a first washcoat slurry comprising a first porous refractory oxide material comprising alumina impregnated with at least one base metal component selected from the group consisting of oxides of copper, manganese, iron, nickel, cerium, praseodymium, and combinations thereof;
    exposing the substrate to the first washcoat slurry to coat with the first washcoat slurry;
    calcining the substrate to form a first layer on the catalyst substrate;
    optionally, forming an intermediate washcoat slurry comprising a porous refractory oxide material;
    optionally, exposing the substrate to the intermediate washcoat slurry to coat with the intermediate washcoat slurry;
    optionally, calcining the substrate to form an intermediate layer on the catalyst substrate;
    forming a second washcoat slurry comprising a second porous refractory oxide material comprising zirconia impregnated with at least one platinum group metal;
    exposing the substrate to the second washcoat slurry to coat with the second washcoat slurry; and
    calcining the substrate to form a second layer on the substrate, wherein the second layer contains less than about 1% by weight alumina and/or the intermediate layer is present and contains less than about 1% by weight alumina.

11. The method of claim 10, wherein the intermediate layer comprises a refractory oxide material selected from the group consisting of silica, zirconia, titanic, cerin, and combinations thereof.

12. The method of claim 10, wherein one or both of the first and second layers further comprise an oxygen storage component.

13. The method of claim 12, wherein the oxygen storage component is ceria.

14. The method of claim 10, wherein the at least one base metal component comprises at least one of copper oxide and manganese oxide and the at least one platinum group metal comprises rhodium.

* * * * *